United States Patent [19]
Deliman et al.

[11] Patent Number: 5,921,635
[45] Date of Patent: Jul. 13, 1999

[54] WHEEL MOUNTING SYSTEM FOR MOLDED LUGGAGE CASE

[75] Inventors: Lawrence J. Deliman, Aurora; Daniel G. Elles, Conifer; James S. Gregg, Aurora; William L. King, Denver; Roger Pedlar, Golden; Elliot J. Younessian, Westminster, all of Colo.

[73] Assignee: Samsonite Corporation, Denver, Colo.

[21] Appl. No.: 08/812,563

[22] Filed: Mar. 6, 1997

Related U.S. Application Data

[60] Provisional application No. 60/013,061, Mar. 8, 1996.

[51] Int. Cl.⁶ .................................................. B60B 19/00
[52] U.S. Cl. .......................... 301/111; 301/125; 301/132; 190/18 A; 280/37
[58] Field of Search .................................. 301/1, 5.1, 111, 301/114, 137, 120, 121, 122, 132, 125; 16/18 R, 45, 46, 97; 190/18 A; 280/37, 47.26

[56] References Cited

U.S. PATENT DOCUMENTS

| | | | |
|---|---|---|---|
| 3,401,981 | 9/1968 | Adams | 301/132 |
| 3,473,819 | 10/1969 | Tantlinger et al. | 301/132 X |
| 4,192,408 | 3/1980 | Walker | 190/18 A |
| 4,229,855 | 10/1980 | Rowe . | |
| 4,244,452 | 1/1981 | Seynhaeve . | |
| 4,311,222 | 1/1982 | Castasnier | 280/47.26 X |
| 4,463,840 | 8/1984 | Seynhaeve | 190/18 A |
| 4,524,482 | 6/1985 | Mueller . | |
| 4,707,881 | 11/1987 | Van Hoye . | |
| 4,854,602 | 8/1989 | Takeuchi . | |
| 5,323,886 | 6/1994 | Chen . | |
| 5,575,361 | 11/1996 | Chou | 190/18 A |

FOREIGN PATENT DOCUMENTS

| | | |
|---|---|---|
| 0106906 A1 | 5/1984 | European Pat. Off. . |
| 9104017 U | 9/1992 | Germany . |
| 2291042 | 1/1996 | United Kingdom . |

*Primary Examiner*—Russell D. Stormer
*Attorney, Agent, or Firm*—Gregory W. O'Connor

[57] ABSTRACT

Luggage cases usually include wheels to aid in their transport. The wheels and their mounting systems must themselves be extremely sturdy, and should not cause weakness or mechanical failure of the luggage case to which they are mounted. The disclosed cantilever wheel mounting assembly 18 includes an axle 22 with a protruding end 26 that fits into an elastomeric mounting block 20 that in turn is received in a corresponding cavity in a molded luggage case shell. A screw fastener 38 passes through one of the walls 15 of the cavity, and through a corresponding hole 44 in the mounting block and through a hole 28 through the end of the axle 22 to hold the assembly in place while permitting the axle to pivot about the fastener when the elastomeric block flexes in response to vibrations and impacts in use.

12 Claims, 5 Drawing Sheets

WHEEL MOUNTING SYSTEM FOR MOLDED LUGGAGE CASE

This application claims the benefit of U.S. Provisional Application No. 60/013,063, filing date Mar. 8, 1996.

BACKGROUND OF THE INVENTION

Today, most luggage cases over a certain size include wheels to ease their transport. One problem encountered is how to mount these wheels firmly and dependably to the luggage case. This mounting problem is especially compounded when the wheel is of the type cantilevered from one end of an axle fixed to the case. That is, a cantilever wheel is mounted by its axle to a luggage case on only one side of the rotating tire. This is in contrast to a wheel mounted on an axle supported by the luggage case on both sides of the rotating wheel. A cantilever-type wheel is desired where the wheel base of the luggage case (that is the distance between a pair of wheels) must be maximized. An example would be the type of case called an upright case, especially where this upright case is used to carry other luggage cases such as that shown in U.S. Pat. No. 4,759,531 specifically incorporated herein by reference. This patent is assigned to Samsonite Corporation, assignee of the subject invention.

Not only is it desirable that the wheel base be on a luggage case as large as possible, limited only by the width of the wheeled luggage case, but the mounting assembly for the wheel must be extremely robust. Weight of the case on the wheels is a prime factor, but since the case is specifically designed to carry other cases, weight carried by just two wheels can be considerable.

The dynamic stresses to which such a wheel system is subjected also can be enormous, especially if the luggage to which the assembly is to be attached is of a type molded of one monolithic piece. Such luggage cases consist of two molded shells. Attaching such a robust wheel system to a luggage shell may result in stress cracking the molded shell because the load borne by the wheels, and thus the stress caused by that load, tends concentrate in a relatively small portion of the shell structure. This is especially true in the absence of a true undercarriage mechanism, such as that disclosed in the above-referred to patent. Such an undercarriage is expensive, complicated to assemble, and adds considerably to the weight of the luggage case.

OBJECTS OF THE INVENTION

Accordingly, one object of the subject invention is to provide a simple lightweight wheel assembly that both absorbs blows on the wheel to relieve shock transferred to the luggage case, but also spreads the shock and mechanical forces transferred to the luggage during wheeling such luggage or when the luggage case is dropped onto its wheel assembly.

It is another objection of the invention to provide a simple, foolproof wheel assembly that reduces labor costs and errors in installing the wheel assembly on the luggage case.

SUMMARY OF THE INVENTION

The invention comprises a wheel assembly for a molded luggage case. The wheel assembly comprises a wheel and an axle about which the wheel rotates during use. The axle includes a portion projecting beyond the wheel that includes a hole passing through the distal end thereof. A mounting block is attached to and surrounds the projecting end of the axle. This mounting block has a generally cylindrical or conical shape that corresponds to the shape of a cavity molded into the portion of the shell of the molded luggage case. The mounting block also includes a hole that, when the protruding end of the axle is mounted therein, corresponds to the hole in the end of the axle. The mounting block with the axle mounted therein can be inserted in the correspondingly shaped cavity. A penetrating fastener passes through a wall of the mounting cavity, through the hole in the block, and into the hole in the axle to hold the wheel assembly to the luggage case. Preferably, the hole and thus the screw passing therethrough is mounted well toward the innermost end of the mounting cavity. In this way, the mounting block and axle need flex and pivot only slightly about the screw, to help absorb and accommodate impacts as the wheel rolls on the horizontal surface.2

The mounting block preferably consists of a thermoplastic elastomer having a hardness in the range of 45 to 85, preferably about 65 when measured using a type D durometer. The mounting block has an overall conical shape having at least one side that corresponds to the outer shape of the luggage case to which the wheel assembly is mounted.

DETAILED DESCRIPTION OF THE PREFERRED EMBODIMENT

Figure 1:
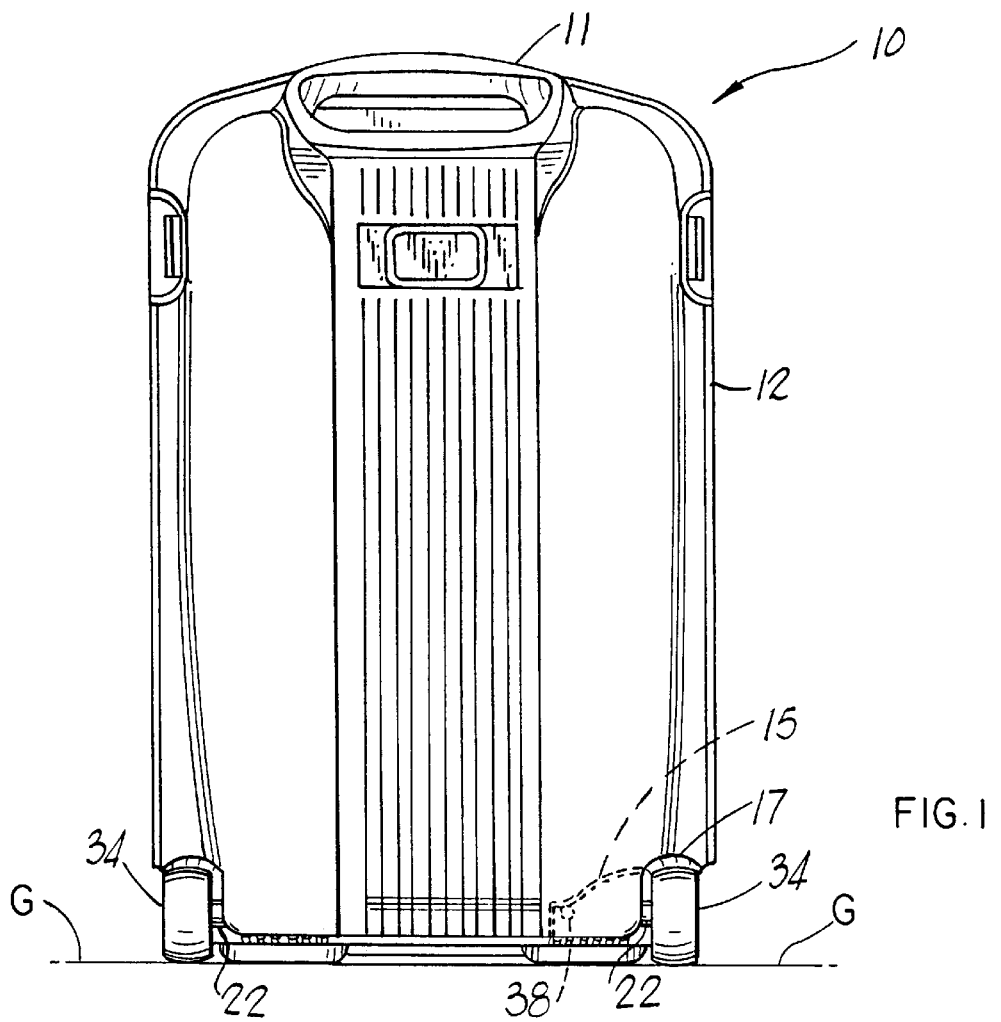
FIG. 1 is a view of an upright luggage case showing wheel assemblies according to the preferred embodiment of our invention.
Figure 3:
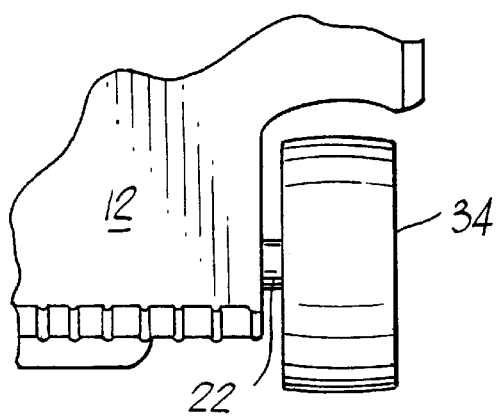
FIG. 3 is a close-up of a portion of the luggage case shown in FIGS. 1 and 2 as viewed from the bottom of FIG. 3, detailing a wheel protruding from the right rear corner of the case.
Figure 5:
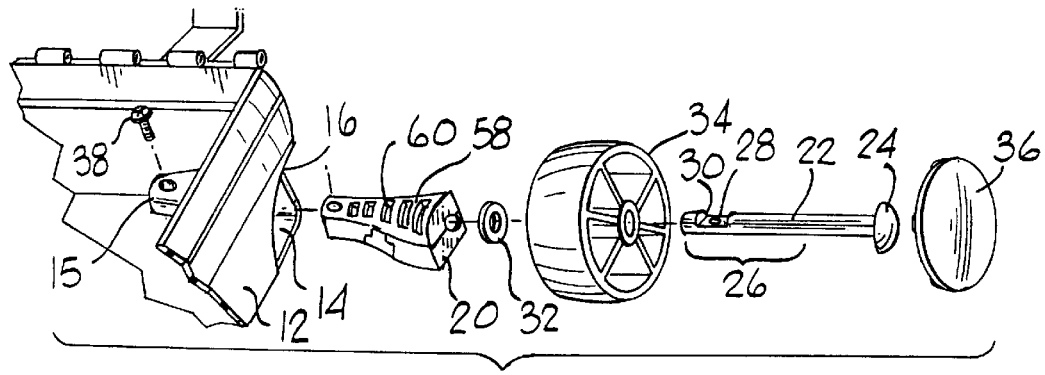
FIG. 5 is an exploded view of the wheel mounting assembly.
Figure 7:
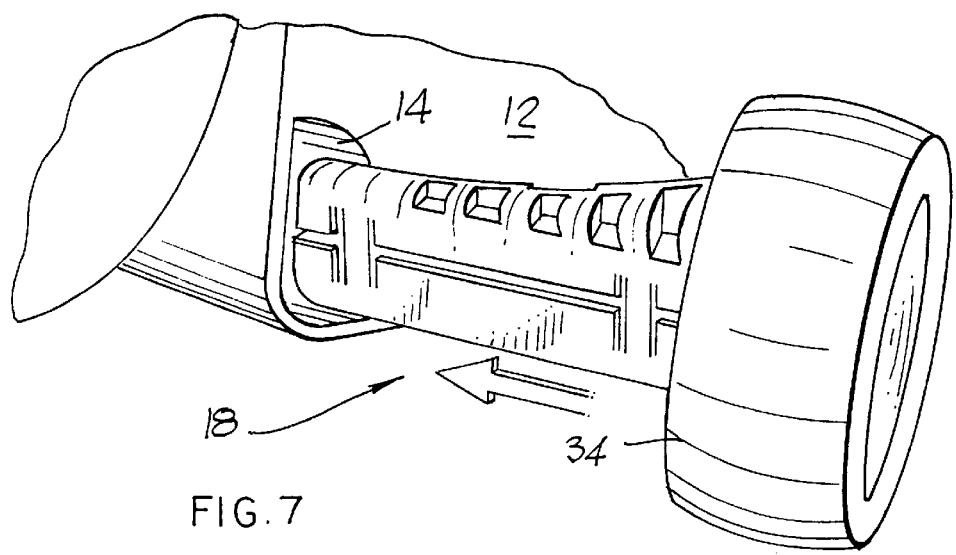
FIG. 7 shows a wheel mounting assembly being installed into a luggage shell.

Referring to the figures, a luggage case 10 is of a generally known upright type comprises two injection molded shells hinged together to form the overall luggage case. Here, the base shell 12 includes a pair of generally prismatic-shaped cavities 14 (FIGS. 5 and 7). Since this case has two wheels, these two mirror image cavities are molded into opposite corners along one edge. As can be seen in dashed lines in FIG. 1 and directly in FIGS. 2, 5, and 9, the molded walls 15 on the inside surfaces of this cavity 14 are shown from the inside of the base shell 12 in the right rear corner. Note that this cavity opens out toward a partial right circular cylindrical shape 17 at the outermost end of the walls 15.

This cylindrical portion forms the wheel well in which the wheel normally rotates mostly within the overall profile of the base shell 12. The case is normally wheeled along the ground G on the two wheels 34 in a generally vertical but slightly tilted attitude by extendable wheel handle 11. Other luggage cases can be carried by this case by a hook or strap mechanism (not shown) as is well known now. Details of one such strap mechanism are set forth in the U.S. Pat. No. 4,759,431.

Figure 2:
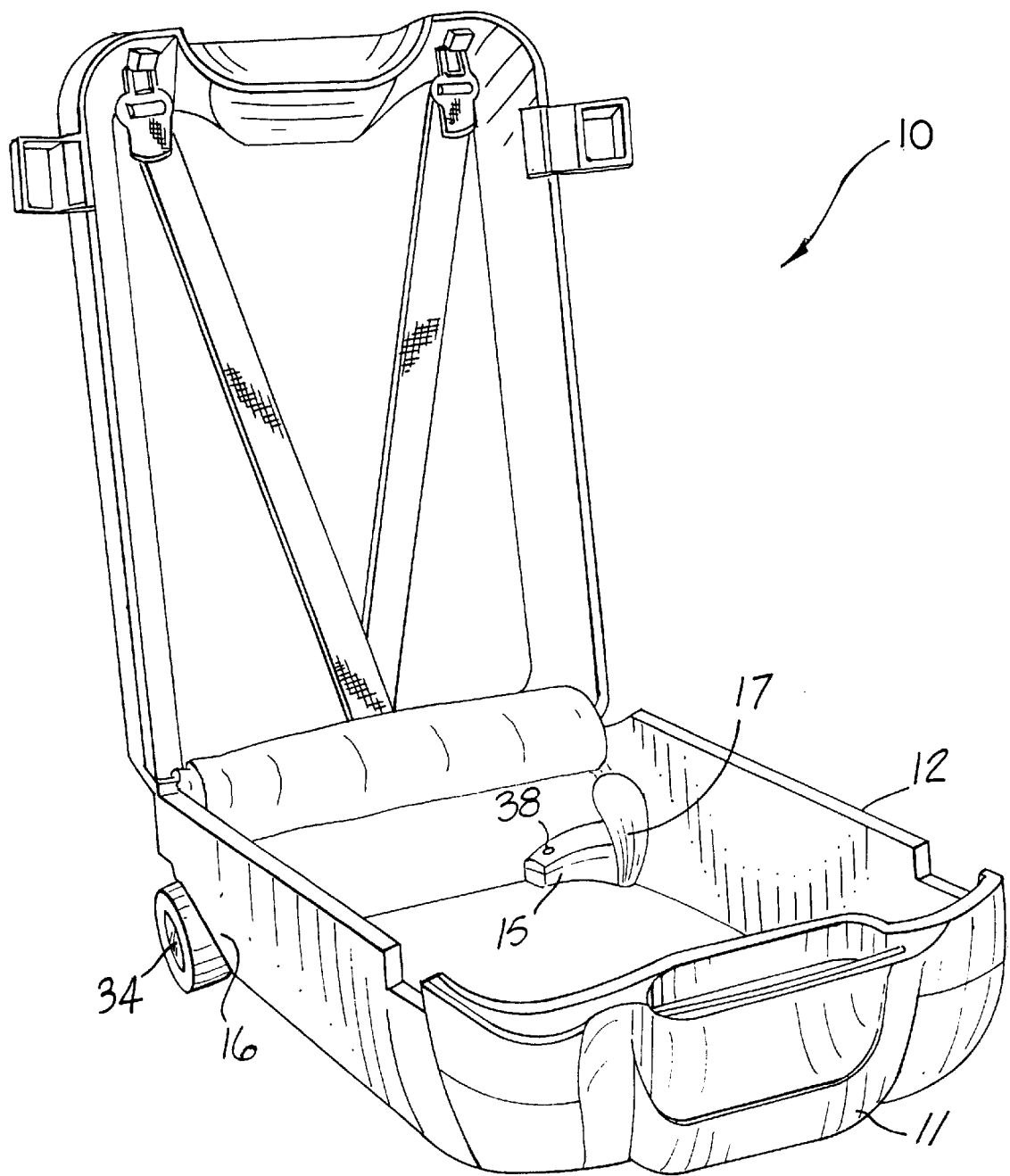
FIG. 2 shows the wheeled luggage case of FIG. 1 with the molded shell portions open to show the interior thereof.
Figure 9:
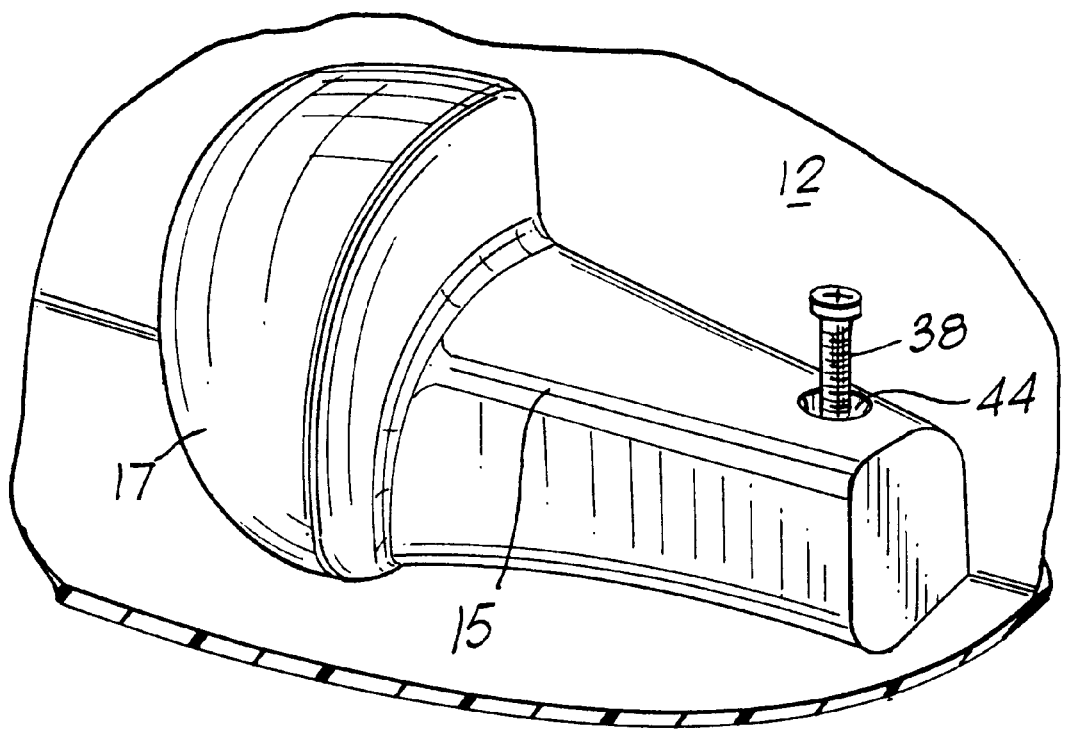
FIG. 9 is an inside view of a broken away portion a luggage shell.

FIG. 9 shows more clearly the interior contours of these walls 15 and 17 of the cavity 14 as it would look for the wheel on the opposite or left rear corner of the luggage shell shown in FIG. 2. In the preferred embodiment, the general conical or pyramid shaped cavity 14 inboard of a generally partial right circular cylindrical shaped wall 17 of the wheel well 16 is formed in the outer contour of the base shell. The figures show the conical or pyramid shape continuously tapering from a larger overall circumference near the wheel to a fairly small end at the inboard end. In practice, the shape need not taper greatly to benefit from the invention, as will be detailed.

Figure 4:
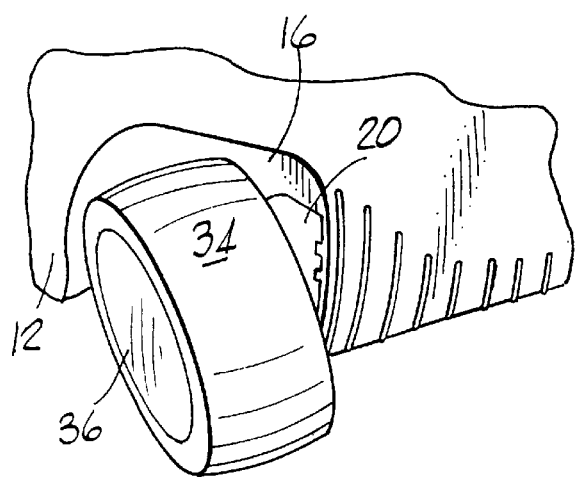
FIG. 4 is a perspective view of the wheel protruding from the case.

The wheel assembly includes the wheel 34 and a hub cap 36 snap-fitted to the outer circular face of the wheel 34. Greater detail of the wheel assembly is shown in FIG. 4. An axle 22 is inserted in through a central hub of the wheel 34. This axle includes a head 24 that rides within the wheel 34 beneath the hub cap 36. The head 24 is too large to pass through the wheel hub so that the wheel and axle stay assembled. Just inboard of the wheel is anti-friction washer 32. The axle and washer are both of steel, treated to help resist corrosion. The wheel and hub are of conventional luggage material such as ABS plastic or nylon with a co-injected rubber tread portion. The hub cap can be a less expensive material since it takes very little wear and tear. The axle has a protruding end 26 that extends well beyond the inboard side of the wheel. This protruding end 26 includes a hole 28 that passes diametrically through the extreme end thereof. One side of the hole passes through a portion of the axle with a generally rectangular notch 30. The hole 28 and notch 30 combine to help hold, fasten, and position the axle and wheel in a mounting block 20. Major portions of the mounting block consist of molded ribs 58 which preferably run perpendicular to the axle 22. These ribs are separated by correspondingly shaped slots 60. The mounting block 20 itself is an injection molded shape of a thermoplastic elastomer such as those polyether-ester block copolymer elastomers available from Dupont under the trademark Hytrel rubber . Hytrel rubber has the processability of thermoplastics, yet resists long-term deformation or creep like a true rubber. These materials should be rather stiff having a durometer of at least 45 to 85, preferably around 65 on the D scale.

Figure 6:
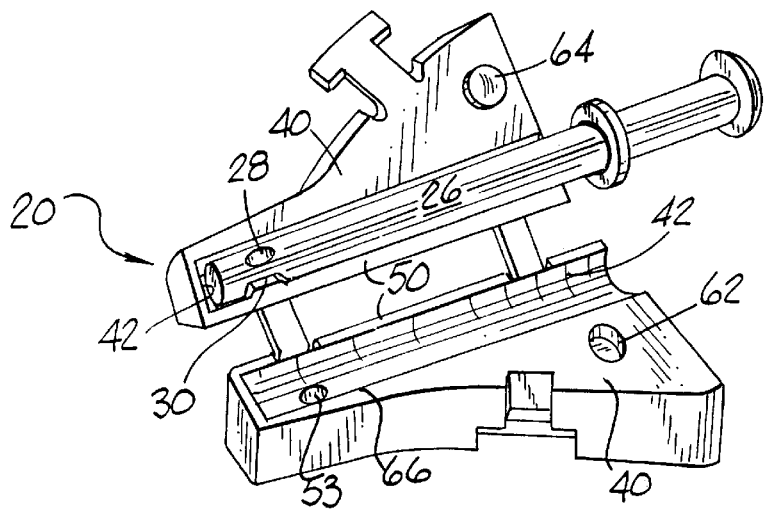
FIG. 6 shows a partially completed wheel axle assembly.

A screw 38 is used to hold the wheel assembly in the cavity. Preferably, a hole 44 sized to receive the screw 38 is drilled into or molded into the end of the cavity during the molding of the base shell 12. FIG. 6 shows the protruding end 26 of the axle 22 positioned in a semi-cylindrical slot 42 passing through a lower portion of each half block 40 parallel to one generally flat side 50 of the otherwise generally conical shaped mounting block 20. Each half block 40 includes a hole 53 that corresponds to the hole 28. These half block form, when properly assembled, the mounting block 20 which encases the protruding end 26 of the axle 22 in the mated semi-cylindrical slots 42.

To assure that the hole 28 and the holes 44 are aligned for easy assembly and reasonably aligned during the rigors of the use of the case, one of the half blocks includes a key 66 that is essentially a rectangular protrusion that corresponds to the rectangular slot or notch 30 in the axle. One of the half blocks 40 includes a protrusion 62 in one large flat mating face 50 and the other face 50 includes a correspondingly shaped socket 64 to receive the protrusion 62. This protrusion and socket inter-engagement assures that the half blocks 40 will remain aligned during assembly and during the rigors imposed on the block during use of the luggage case.

Figure 10A:
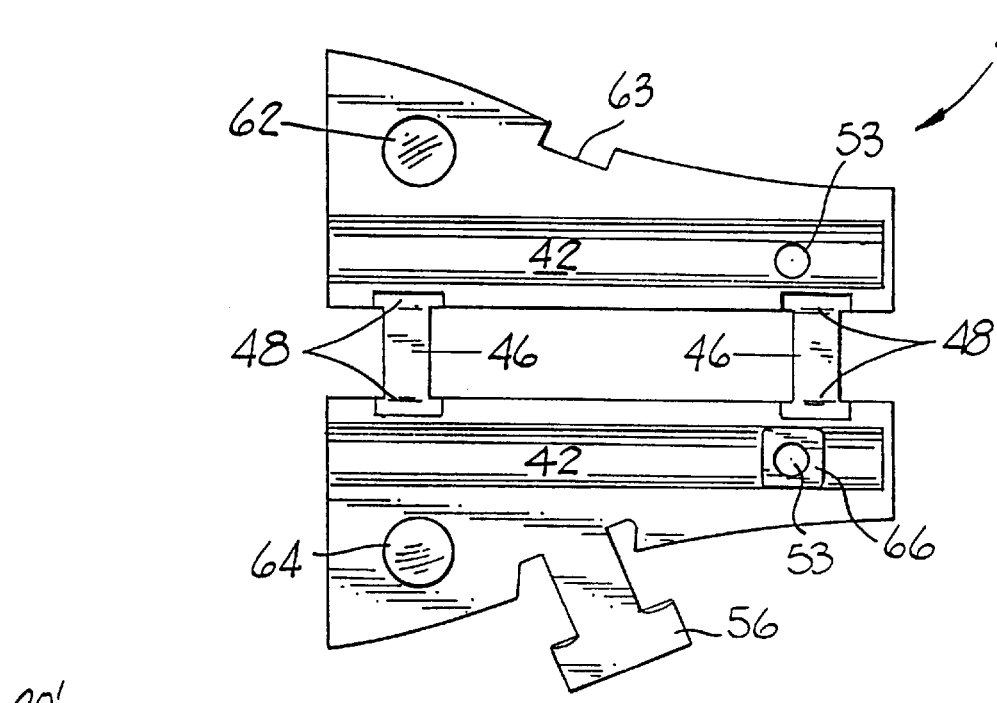
FIGS. 10a and 10b show inside and outside views of an unassembled mounting block showing the opposite sides thereof.
Figure 10B:
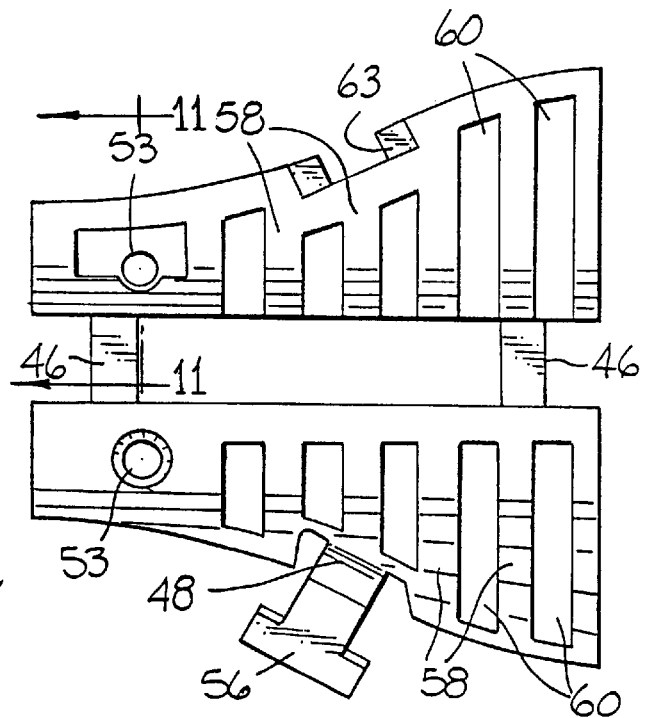

FIGS. 10a and 10b show the mounting block 20 detailing some further features to aid in assembly. For example, FIG. 10a is a view showing the mating surfaces of two half blocks 40 which form the inside surfaces of the block 20 when assembled. These half blocks are molded with an integrally formed hinged tab 46 located toward each end thereof. Each hinge tab 46 is flexibly attached to the half blocks 40 by living hinges 48. a flexible tab 56, also attached to its respective half block 40 by a living hinge 48, protrudes in the opposite half block 40. There is shown a T-shaped slot 63 that receives the tab 56 when the two blocks are hinged toward one another on their hinge tabs 46 to embrace an axle as outlined above with regard to FIG. 5. Note that, as seen also in FIG. 5, the semi-cylindrical slots 42 are located parallel to and close to the flatter sides of the mounting block.

FIG. 10b shows the opposite side of this pair of half blocks 40. Note in the ribs 58 and slots 60, and holes 53 pass through both half blocks 40. These holes 53, of course, align with one another when the half blocks 40 are hinged together around the axle 22. FIGS. 10a and 10b show the unassembled half blocks in their full size, so the dimensions shown are substantially ideal.

Figure 11:
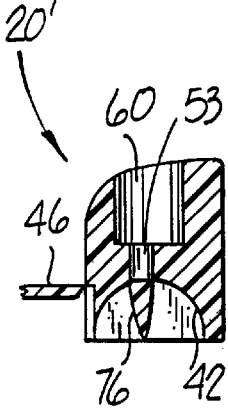
FIG. 11 is a partial cross-sectional view taken along line 11—11 of FIG. 10b, showing an alternate construction.

An alternate assembly aid is shown in FIG. 11 which is a cross-section along a hole 53 in a slightly different block 20'. Instead of a rectangular block 66 to guide and position the hole 28 of the axle into alignment with the holes 53, this block has a conical protrusion 76 integrally molded across and axially aligned with the hole 53.

Only a small bridge or flash of the molded elastomer holds the protrusion in this axial position. The wheel, washer and axle are assembled to this block by merely placing the protrusion into the hole 28 on the axle. The block halves are then clipped closed about the axle, with the hole 28 being kept in alignment with the holes 53 by the protrusion 76. When the screw 38 is driven home through the hole 44 in the case shell, through the holes 53 and 28, the protrusion is easily torn from its tenuous attachment on the edge of the hole 53, thus letting the screw pass through and seat properly.

Figure 8:
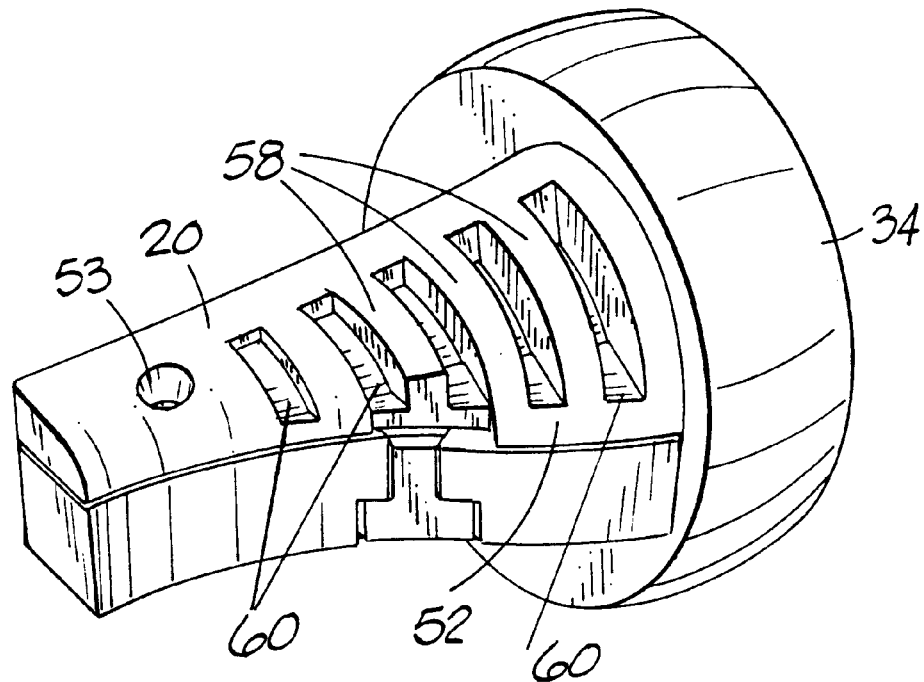
FIG. 8 is a view of a wheel mounting assembly from another perspective.

FIG. 8 shows the overall wheel assembly 18 ready to insert into the cavity 14 of base shell 12. This figure shows the ribbed side opposite that shown in FIG. 7 that better shows the curved sides 52 of the mounting block. FIG. 9 shows the interior view of the inner walls 15 of cavity 14 and better shows the curving shape that corresponds to that side of the cavity that receives the curving face of the mounting block as shown in FIG. 8. Screw fastener 38 is shown ready to be driven home through the block, through the hole 28 in the axle 22, and into the other side of the cavity 14 in the shell 12. The slots 60 between the ribs 58 not only reduce the cost and weight of the mounting block 20, they permit some elastic compression of the block within the cavity 14 when the wheel suffers a severe impact, such as when the case is dropped on the mounted wheel.

Referring to FIG. 7, it can be seen that the cavity 14 is surrounded on all lateral sides thereof by molded walls of the base shell 12. This cavity 14 can also be formed of only the walls 15 on the inner sides of the cavity. The walls forming the outer corner of the case and the corresponding outward walls of the cavity 14 could be eliminated. This could simplify forming the cavity by eliminating the need for movable mold parts when the base shell 12 is injection molded. Such an open-sided cavity formation would permit use of lower cost shell molding systems such as vacuum molding that generally are not used to form closed-sided openings or cavities.

Other variations on this mounting scheme are contemplated in this invention. For example, instead of using a screw fastener 38 and an axle with a hole 28 passing through the extreme end to receive the fastener, as shown in FIG. 5 for example, one could use an axle with a leg protruding at a right angle to its main axis. This leg could pass through a hole in the mounting block, and thence through a mounting hole in the wall 15 of the luggage case shell. A nut or other fastener would then affix the end of the protruding leg to the shell, thus fastening the wheel, the axle, and the mounting block to the case. In either of these constructions, the axle is provided a firm attachment to the case, but the axles and wheels are free to pivot about this attachment when the block compresses in response to vibration and impact forces when the case is rolled on its wheels. To take best advantage of this pivoting, the screw 38 (or the leg of the angled axis in the alternative construction outlined above) is oriented along an axis parallel to the bottom of the luggage case when the case is rolling on the wheels.

The benefits of this wheel mounting assembly include simple and consistent construction operations, superior strength to weight characteristics of the completed wheeled case, and minimal reduction of packing volume in the luggage case shell.

While we have shown and described various embodiments according to the present invention, the invention is of course not limited to these embodiments. Once apprised of these embodiments, many modifications and changes would be known to those skilled in the art of luggage construction. Indeed, the scope of our invention is limited only by the appended claims.

We claim:

1. The combination of a luggage case and a wheel assembly, the luggage case including a mounting cavity having a shape and a wall, the mounting cavity being molded into part of the luggage case, comprising:
   a wheel,
   an axle about which the wheel rotates during use, the axle includes a protruding portion projecting beyond the wheel that includes
     a hole passing through a distal end thereof,
     a mounting block attached to and surrounding the protruding portion of the axle, the mounting block has a generally prismatic shape, the mounting block further includes a hole that, when the protruding portion of the axle is mounted therein, corresponds to the hole in the distal end of the axle, whereby the mounting block with the axle mounted therein can be placed in the mounting cavity, and
     a penetrating fastener for passing through a wall of the mounting cavity, through the hole in the mounting block, and into the hole in the axle to hold the wheel assembly to the luggage case and wherein the hole in the axle and the penetrating fastener passing therethrough is mounted well toward an innermost end of the mounting cavity, and whereby the axle can pivot about the penetrating fastener, to help absorb and accommodate impacts as the case is transported on the wheel.

2. A combination luggage case and wheel assembly as set forth in claim 1, the mounting block has a generally prismatic shape that corresponds to the shape of the cavity.

3. A combination luggage case and wheel assembly as set forth in claim 1, wherein the mounting block is made of a thermoplastic elastomer having a hardness of about 65 when measured using a type D durometer.

4. A combination luggage case and wheel assembly as set forth in claim 1, wherein the luggage case has a base shell having an outer contour and the mounting cavity is molded in the base shell in a position adjacent the outer contour thereof, and the mounting block has an overall conical or pyramid shape having at least one side that corresponds to a portion of the outer contour of the base shell.

5. A combination luggage case and wheel assembly as set forth in claim 4, wherein access to the mounting cavity is through a hole normally facing the wheel when the wheel is mounted to the shell.

6. A combination luggage case and wheel assembly as set forth in claim 1 wherein the mounting block comprises two half blocks, each with a semi-cylindrical slot sized to receive part of the protruding portion of the axle, and means for positioning the two half blocks to align each semi-cylindrical slot such that the protruding portion of the axle is held between the half blocks within the aligned cavities.

7. A combination luggage case and wheel assembly as set forth in claim 6 wherein the mounting block includes a series of slots and a series of ribs between the slots, whereby the quantity of elastomeric material in the block is reduced, and the effective resilient characteristics of the block are modified.

8. A wheel assembly for a molded luggage case (10) comprises a wheel (34), an axle (22), the axle (22) includes a protruding portion (26) projecting beyond the wheel (34) that includes a hole (28) passing through a distal end thereof, a penetrating fastener,
   a mounting block (20) surrounding the protruding portion (26) of the axle (22), the mounting block (20) has a shape intended to correspond to the shape of a cavity (14) molded into part of the molded luggage case, the mounting block (20) further includes a hole (53) and further comprises two half blocks, each with a semi-cylindrical slot sized to receive part of the protruding portion of the axle, and means for positioning the two half blocks to align each semi-cylindrical slot such that the protruding portion of the axle is held between the half blocks within the aligned cavities, whereby the mounting block (20) with the axle (22) mounted therein can be placed in the correspondingly shaped cavity (14), a penetrating fastener (38) intended to pass through a wall (15) of the mounting cavity (14), whereby
   during use, the wheel (34) rotates about the axle (22) the mounting block (20) is attached to the protruding portion (26) of the axle (22) and has a generally prismatic shape, and
   when the protruding portion (26) of the axle (22) is mounted in the mounting block (20), the hole (53) of the mounting block (20) corresponds to the hole 28 in the end of the axle (22),
   and the penetrating fastener (38) passes into the hole 28 in the axle (22) to hold the wheel assembly to the luggage case.

9. The wheel assembly for a molded luggage case as set forth in claim 8 wherein the mounting block has a generally prismatic shape that corresponds to the shape of the cavity.

10. The wheel assembly for a molded luggage case as set forth in claim wherein the mounting block is made of a thermoplastic elastomer having a hardness of about 65 when measured using a type D durometer.

11. The combination of a luggage case and a wheel assembly, the luggage case including a mounting cavity having a shape and a wall, the mounting cavity being molded into part of the luggage case, comprising:

a wheel, an axle about which the wheel rotates during use, the axle includes a protruding portion projecting beyond the wheel that includes a hole passing through a distal end thereof, a mounting block attached to and surrounding the protruding portion of the axle, the mounting block has a generally prismatic shape, the mounting block further includes a hole that, when the protruding portion of the axle is mounted therein, corresponds to the hole in the distal end of the axle, whereby the mounting block with the axle mounted therein can be placed in the mounting cavity, and a penetrating fastener for passing through a wall of the mounting cavity, through the hole in the mounting block, and into the hole in the axle to hold the wheel assembly to the luggage case, wherein the mounting block comprises two half blocks, each with a semi-cylindrical slot sized to receive part of the protruding portion of the axle, and means for positioning the two half blocks to align each semi-cylindrical slot such that the protruding portion of the axle is held between the half blocks within the aligned cavities.

12. The combination of a luggage case and a wheel assembly as set forth in claims 11 wherein the mounting block includes a series of slots and a series of ribs between the slots, whereby the quantity of elastomeric material in the block is reduced, and the effective resilient characteristics of the block are modified.

* * * * *